United States Patent [19]
Cawlfield et al.

[11] Patent Number: 5,401,477
[45] Date of Patent: Mar. 28, 1995

[54] PROCESS FOR PRODUCING SOLID MANGANESE DIOXIDE

[75] Inventors: David W. Cawlfield; Leslie R. Ward, both of Cleveland, Tenn.

[73] Assignee: Olin Corporation, Stamford, Conn.

[21] Appl. No.: 180,838

[22] Filed: Jan. 12, 1994

Related U.S. Application Data

[63] Continuation-in-part of Ser. No. 987,503, Dec. 7, 1992, Pat. No. 5,279,743.

[51] Int. Cl.$^6$ .............................................. C01G 45/02
[52] U.S. Cl. ........................................ 423/50; 423/51; 423/605
[58] Field of Search ...................... 423/49, 50, 51, 605

[56] References Cited

U.S. PATENT DOCUMENTS

| | | | |
|---|---|---|---|
| 2,956,860 | 10/1960 | Welsh | 423/605 |
| 3,056,656 | 10/1962 | Nicolaisen | 423/476 |
| 3,640,683 | 2/1992 | Miyazaki et al. | 423/49 |
| 4,006,217 | 2/1977 | Faber et al. | 423/605 |
| 4,402,931 | 9/1983 | Tanabe et al. | 423/605 |
| 5,279,743 | 1/1994 | Ward et al. | 210/638 |

OTHER PUBLICATIONS

Kauffman, J. W. et al., "Particulate manganese dioxide . . . manufacture", Faming Zhaanli Shenging Gongkai Shuomingshu, 49-3, Feb. 1987, pp. 1-12.

*Primary Examiner*—Steven Bos
*Attorney, Agent, or Firm*—William A. Simons

[57] ABSTRACT

A process for producing manganese dioxide comprising the steps of:

(1) reacting manganese oxide with a molar excess of an aqueous chloric acid solution in a reaction zone to form a reaction mixture in said zone comprising chlorine gas, a solid phase containing manganese dioxide, and a liquid phase containing chloric acid and water; the concentration of chloric acid in said liquid phase is greater than about 5% by weight of said liquid phase upon leaving the reaction zone;

(2) separating said chlorine gas from said solid phase and said liquid phase;

(3) separating said solid phase containing manganese dioxide from liquid phase containing chloric acid and water;

(4) removing water from said separated liquid phase to concentrate said chloric acid in said separated liquid phase; and (5) returning said separated and concentrated liquid phase back to said reaction zone for further reaction with manganese oxide.

8 Claims, No Drawings

PROCESS FOR PRODUCING SOLID MANGANESE DIOXIDE

This application is a continuation-in-part application of U.S. Patent application Ser. No. 07/987,503, now U.S. Pat. No. 5,279,743, that issued on Jan. 18, 1994, which was filed on Dec. 7, 1992 with Leslie R. O. Ward and David W. Cawlfield as the named inventors and has been allowed. This parent application is incorporated herein by reference in its entirety.

BACKGROUND OF THE INVENTION

1. Field of the Invention

The present invention relates to a process of producing solid manganese dioxide by the oxidation of manganese oxide with a chloric acid solution.

2. Brief Description of the Art

Manganese dioxide ($MnO_2$) (also known as manganese binoxide, manganese peroxide; manganese superoxide; and black manganese) is a strong oxidizer and is used in the manufacture of manganese steel; in alkaline batteries (dry cells); for making amethyst glass or decolorizing glass; and painting on porcelain, faience, and majolica. It is also used in electrotechnics, pigments, browning gun barrels, drier for paints and varnishes, printing; dyeing textiles; and making potassium permanganate. It is characterized as follows: has a molecular weight of 86.94; when ignited, evolves oxygen and leaves $Mn_3O_4$; insoluble in water, nitric acid, or cold sulfuric acid; slowly dissolves in cold HCl with evolution of $Cl_2$; in the presence of hydrogen peroxide or oxalic acid, it dissolves in dilute $H_2SO_4$ or $HNO_3$.

Manganese dioxide is a naturally occurring substance; it occurs in nature as the mineral pyrolusite. It is also made artificially by various processes.

U.S. Pat. No. 3,640,683, which issued to Miyazaki et al. on Feb. 8, 1972, teaches several processes for making manganese dioxide:

(1) thermal decomposition of manganese nitrate ($MnNO_3$) to manganese dioxide and NO gas;

(2) oxidation of manganese hydroxide [$Mn(OH)_2$] particles with air or an oxidizing agent or oxygen or ozone to form manganese dioxide;

(3) oxidation of manganese sulfate ($MnSO_4$) with an oxidizing agent (e.g., chlorate, hypochlorite, permanganate, or peroxide) to form manganese dioxide and by-product salts and gases;

(4) disproportion of a manganese suboxide ($Mn_2O_3$) with sulfuric acid to form manganese dioxide and a manganese sulfate by-product;

(5) thermal decomposition of manganese chloride; and (6) roasting a naturally occurring, but crude, manganese dioxide-containing ore with air or oxygen; then reacting the roasted ore with a hot aqueous solution of chlorate salt and sulfuric acid; separating the formed needle-like manganese dioxide particles from the hot aqueous solution and then washing the separated manganese dioxide with water.

U.S. Pat. No. 4,402,931, which issued to Tanabe et at. on Sep. 6, 1983, teaches a process of producing manganese dioxide by (1) heating and decomposing a solution of ammonio complex of manganese (manganese ammonium carbamate) at a temperature of 68°–80° C.; (2) then optionally roasting the resulting manganese carbonate in air containing 15–85% steam; (3) roasting the manganese carbonate at a temperature of 275°–375° C. in oxygen containing 15–85% steam; and (4) treating the resulting manganese dioxide by heating it in either (a) a diluted sulfuric acid, (b) a solution of sulfuric acid and chlorate, or (c) a solution of sulfuric acid, manganese carbonate and chlorate.

In the commercial process for producing manganese dioxide by chemical oxidation that involves an acidic solution made by sulfuric acid and sodium chlorate salt, the oxidation reaction consumes chlorate and releases chlorine ($Cl_2$) and chlorine dioxide ($ClO_2$) gases as well as producing sodium ions, sulfate ions, sulfuric acid, and chlorate ions as by-products which must be purged from the system. The chlorine ($Cl_2$) and chlorine dioxide ($ClO_2$) gases may be hazardous if large concentrations are formed. These gases and the by-products require neutralization, which may involved large quantities of a base. Accordingly, such processes have important commercial limitations.

U.S. patent application Ser. No. 07/987,503, which was filed Dec. 7, 1992 with Leslie Ward and David Cawlfield as the named inventors and has been allowed as U.S. Pat. No. 5,279,743, teaches a process of separating zinc and manganese oxide by (1) reacting said oxide mixture with a chloric acid solution to form a mixture having a solid phase containing manganese dioxide and a liquid phase containing chloric acid solution and dissolved zinc ions contained therein and (2) then separating the solid and liquid phases. This reference further teaches mixing the separated solid phase with a second chloric acid solution to dissolve remaining zinc oxide in the manganese dioxide and then separating that second chloric acid solution containing additional zinc ions from a substantially pure solid manganese dioxide product.

While the teachings of U.S. patent application Ser. No. 07/987,503, now U.S. Pat. No. 5,279,743, represent a significant commercial advance over the preexisting oxidation routes for making manganese dioxide, the problem of recovering the valuable chloric acid after separation of the solid manganese dioxide exists. The present invention is a solution to that problem. Furthermore, the invention of patent application Ser. No. 07/987,503, now U.S. Pat. No. 5,279,743, is limited to a process of separating zinc and manganese oxides with chloric acid. It has now been found that an extension of that invention is also acceptable to producing manganese dioxide from quantities of manganese oxide not contaminated with zinc oxide and also allows for the recovery of valuable chloric acid.

SUMMARY OF THE INVENTION

The present invention, therefore, is directed to a process for producing manganese dioxide comprising the steps of:

(1) reacting manganese oxide with a molar excess of an aqueous chloric acid solution in a reaction zone to form a reaction mixture in said zone comprising chlorine gas, a solid phase containing manganese dioxide, and a liquid phase containing chloric acid and water; the concentration of chloric acid in said liquid phase is greater than about 5% by weight of said liquid phase upon leaving the reaction zone;

(2) separating said chlorine gas from said solid phase and said liquid phase;

(3) separating said solid phase containing manganese dioxide from said liquid phase containing chloric acid and water;

(4) removing water from said separated liquid phase to further concentrate said chloric acid in said separated liquid phase; and (5) returning said separated and concentrated liquid phase back to said reaction zone for further reaction with manganese oxide.

DESCRIPTION OF PREFERRED EMBODIMENTS

As mentioned above, the first step of the present invention involves the reaction of manganese oxide with chloric acid in a reaction zone to form chlorine gas, a solid phase containing manganese dioxide, a liquid phase containing chloric acid and water. This reaction may be represented by the following reaction equation (1):

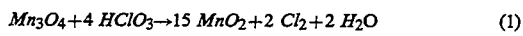

$$Mn_3O_4 + 4\ HClO_3 \rightarrow 15\ MnO_2 + 2\ Cl_2 + 2\ H_2O \qquad (1)$$

Manganese oxide, $Mn_3O_4$, (also known as manganic manganese oxide) has a molecular weight of 228.81 and is thermally the most stable manganese oxide. It is generally in the form of black rhombi crystals that have a melting point of 1,564° C. Manganese oxide is soluble in hydrochloric acid but insoluble in hot and cold water. Different manganese oxides (e.g. $Mn_2O_3$-manganic oxide; MnO-manganous oxide) may be present as well as mixtures of different manganese oxides. The term "manganese oxide" as used in the present specification and claims is defined to mean all forms of manganese oxide. The manganese oxide may be added to the reaction zone in the form of solid granules or crystals or in an aqueous solution or slurry. The present invention also encompasses the use of impure forms of manganese oxide such as mixtures of manganese oxide and manganese carbonate. In the latter case, carbon dioxide would be additional product of this reaction.

Chloric acid, $HClO_3$, is a strong oxidizing agent whose oxidizing properties vary somewhat with the pH and the temperature of the solution. It is fairly stable in cold water solutions of up to about 30% by weight. Upon heating, it may evolve chlorine or chloride dioxide or both, depending upon the strength of the solution. Aqueous chloric acid solutions may be concentrated by evaporation under reduced pressure to where the chloric acid concentration in the solution is greater than 40% by weight.

Chloric acid solutions suitable for the present invention may be produced by a variety of processes. See U.S. Pat. No. 5,064,514, which issued to Cawlfield et al. on Nov. 12, 1991 and U.S. Pat. No. 5,108,560, which issued to Cawlfield et al. on Apr. 28, 1992. A source of high purity chloric acid is preferred since impurities in the chloric acid solution would accumulate in the process lines, reaction zone, and concentrating means. For certain applications, it may be desirable to add other chemicals to the reaction zone such as catalysts or crystal growth regulators.

The present invention involves the reaction of manganese oxide with a molar excess of chloric acid in a reaction zone. As described in more detail below, the source of the chloric acid used in this reaction may be fresh chloric acid solution and/or recycled concentrated chloric acid solution. The instant reaction forms water, chlorine gas, and solid manganese dioxide. The reaction mixture in the reaction zone will contains (1) unreacted manganese oxide; (2) unreacted chloric acid; (3) water present in the chloric acid solution and, optionally, which entered with a manganese oxide slurry; (4) water formed by this oxidation reaction; (5) formed chlorine gas; and (6) formed solid manganese dioxide.

The molar excess of chloric acid in the reaction zone allows for completion of the desired reaction and the later concentration and recycle of the chloric acid values. The preferred molar excess of chloric acid is from about 10% to about 300% by moles over the stoichiometric amount needed to convert the manganese oxide. The optimum chloric acid concentration in the fresh chloric acid solution added to the reaction zone may be from about 5% to 40% by weight. The concentration of total chloric acid entering the reaction zone (i.e., fresh chloric acid combined with a recycled concentrated chloric acid solution) should be sufficient so that the liquid phase exiting the reaction zone comprises an aqueous chloric acid solution having a concentration of at least about 5% by weight, preferably at least about 10%.

The reaction zone may be any suitable reaction apparatus for reacting an aqueous solution of chloric acid with manganese oxide. Preferably, the reaction zone is a tube reactor equipped with a gas venting system.

The reaction of the reaction zone is preferably carried out from ambient temperature (e.g., about 20°-30° C.) to boiling temperatures (e.g., 95°-100° C.). More preferably, the reaction is carried out at temperatures from about 40° C. to about 80° C. The preferred reaction pressure is atmospheric, although super-atmospheric and sub-atmospheric pressures may be used. The average reaction time in the reaction zone should be sufficient to achieve a 100% conversion of the manganese oxide to manganese dioxide. Preferably, reaction times from about 1 minute to about 240 minutes may be employed.

The chlorine gas which evolves from the present reaction may be vented to a scrubber for later recovery. Preferably, the chlorine gas is vented directly from the reaction zone.

The reaction mixture, after the removal of the chlorine gas, consists of the solid phase containing manganese dioxide and a liquid phase containing water and chloric acid. The solid phase is then separated from the liquid phase. The separation may be carried out using any standard separation technique. Filtration is one preferred method of separation.

The separated manganese dioxide is preferably washed with water and then preferably dried to yield a dry manganese dioxide product. The manganese dioxide may be dried using any standard drying technique. The preferred method of drying is oven drying at elevated temperatures, preferably from about 70° C. to about 90° C.

The separated liquid phase which contains (1) chloric acid, (2) water from the fresh chloric acid and recycled concentrated chloric acid solutions, and (3) water formed in the reaction of chloric acid and manganese oxide is then concentrated preferably in an evaporator. As mentioned above, the concentration of the chloric acid in this separated liquid phase is at least about 5% by weight of this liquid phase. In the evaporator, the separated liquid phase is subjected to elevated temperatures and reduced pressures to remove water from the liquid phase and thereby form a more concentrated solution of chloric acid. Preferably, this evaporation is carried out at temperatures of about 50°-85° C. and at subatmospheric pressures preferably a vacuum pressure of 1-15 inches of mercury (i.e., about 0.03-0.5 atmospheres).

The regenerated chloric acid solution leaving the evaporator has generally a chloric acid concentration of about 20% to about 40% by weight. Alternatively, the concentration of the chloric acid may be carried out by freeze concentration, reverse osmosis, and electrodialysis.

The regenerated chloric acid solution leaving the evaporator is then returned to the reaction zone for further reaction with more manganese oxide. The reaction of regenerated or recycled chloric acid solution to fresh chloric acid solution added to the reaction zone may preferably be from 95:5 to 5:95 by moles of chloric acid for each solution. The process of the present invention may be carried out in suitable apparatus, including a single vessel where the reaction, liquid/solid separation, and chloric acid concentration are all carried out simultaneously.

This process has the benefit that no toxic liquid waste stream are generated and that the oxidation reaction takes place more rapidly and completely than prior art processes which utilize a sulfuric acid/chlorate oxidizer. Because no liquid waste stream is generated, essentially no manganese values are lost by this process. Also, the chloric acid consumption is lower than the equivalent chlorate consumption in the conventional sulfuric acid/chlorate process.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for producing manganese dioxide comprising the steps of:
   (1) reacting manganese oxide with an aqueous chloric acid solution wherein the chloric acid is in molar excess to the manganese oxide in a reaction zone to form a reaction mixture in said zone consisting essentially of chlorine gas, a solid phase containing manganese dioxide, and a liquid phase containing chloric acid and water; the concentration of chloric acid in said liquid phase is greater than about 5% by weight of said liquid phase upon leaving the reaction zone;
   (2) separating said chlorine gas from said solid phase and said liquid phase;
   (3) separating said solid phase containing manganese dioxide from the liquid phase containing chloric acid and water thereby forming a separated solid phase and a separated liquid phase;
   (4) removing water from said separated liquid phase to concentrate said chloric acid in said separated liquid phase, thereby forming a separated and concentrated liquid phase; and
   (5) returning said separated and concentrated liquid phase back to said reaction zone for further reaction with manganese oxide.

2. The process of claim 1 wherein the molar excess of chloric acid entering the reaction zone to the manganese oxide entering the reaction zone is from about 10% to about 300% of the stoichiometric amount needed to convert the manganese oxide.

3. The process of claim 1 wherein step (1) is carried out at a reaction temperature of from about 20° C. to about 100° C.

4. The process of claim 1 wherein said separating step (3) comprises filtering said solid phase from said liquid phase.

5. The process of claim 1 wherein said separated solid phase containing manganese dioxide is washed with water and then dried to form a dry manganese dioxide product.

6. The process of claim 1 wherein said removing water step (4) comprises evaporating water from said separated liquid phase.

7. The process of claim 6 wherein said evaporating is carried out at a temperature from about 50° C. to about 85° C. at a subatmospheric pressures.

8. The process of claim 7 wherein the concentration of the chloric acid in the separated and concentrated liquid phase after said evaporating is from about 20% to about 40% by weight chloric acid.

* * * * *